United States Patent Office 2,744,876
Patented May 8, 1956

2,744,876

ORGANOTIN DERIVATIVES OF GLYCERYL MONO-ESTERS

Hugh E. Ramsden, Metuchen, N. J., assignor to Metal & Thermit Corporation, New York, N. Y., a corporation of New Jersey No Drawing. Application July 11, 1952, Serial No. 298,462

17 Claims. (Cl. 260—23)

The present invention relates to organotin derivatives of glyceryl mono-esters having utility as stabilizing agents for resins and the like, particularly for halogen-containing materials, and to processes for manufacturing the same.

These new derivatives may be regarded as mono-esters of glycerol in which the hydrogens of two unesterified hydroxyl groups have been replaced by a divalent organotin radical. In the simplest case, that of a monomeric product, the compound is described by the formula (1) 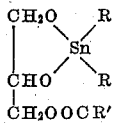

where R is an organic group, attached to the tin atom to improve the organic solubility of the compound, such as an alkyl, aryl or aralkyl group; R' is the residue of an organic acid R'COOH and may be a saturated hydrocarbon group as in lauric or stearic acid, unsaturated hydrocarbon group as in linoleic or oleic acid, or a hydroxyl substituted hydrocarbon group as in ricinoleic acid.

It is obvious that both the organotin group and the mono-ester of glycerol are polyfunctional and that polymeric structures are therefore possible. The most common repeating group is believed to be (2) 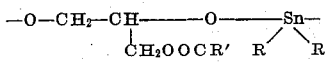

where tin is joined to the two unesterified hydroxyls of the glycerol, just as in the monomeric form above.

When R' is an hydroxyl substituted group reaction may occur in such a way that tin joins to the primary hydroxyl of the glycerol and to the hydroxyl on R' to yield either a monomer or a polymer. The structure of the repeating group would then be written:

(3) 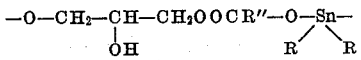

where R"OH=R'. The formula for the monomeric form is produced by joining the two free valences.

More than one mole of organotin compound can be reacted with one mole of glycerol mono-ester and in this case the polymer chain may contain

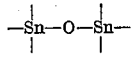

groupings such as exist in the organotin oxides. If such groups occur in units of the general type of Formula 2 we have:

(4) 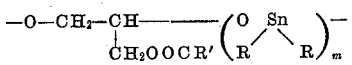

where $m$ represents the number of organotin oxide groups joined together.

When the mono-ester has three hydroxyl groups, i. e. when R' is an hydroxyl substituted group, any excess of organotin reagent over the 1:1 ratio probably reacts with the extra hydroxyl in preference to forming

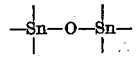

bonds.

We have found that useful products may be made using as starting materials commercial grades of glyceryl monoesters. Such commercial mono-esters may contain as little as 60% of actual mono-ester, the balance of the product being made up of di- and tri-esters and glycerol, the overall composition having about one acid residue per glycerol residue. Many organotin products are of course produced from such a mixture. Separation of these products is extremely difficult but fortunately it is ordinarily unnecessary. For use in stabilizing polyvinyl chloride plastics we have found that the mixed organotin products prepared from commercial glyceryl mono-esters are effective.

We believe that the product of any particular reaction is a complex mixture containing several of the molecular species described above. However, at least 50% of the product will be made up of monomeric or polymeric species having the structural element:

(5) 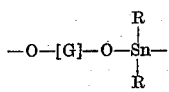

wherein [G] represents a glycerol mono-ester molecule less two hydroxyl groups and R' is as defined above. End groups for the polymeric forms may be supplied by the mono-functional di esters present in the commercial glyceryl mono-esters or in many other ways.

These compounds may be prepared in any suitable manner. It has been found however that these products may be prepared conveniently by reacting an organotin compound with a glyceryl mono-ester, removing the water of condensation, and recovering a reaction product having the above structural formulae. More specifically, an organotin compound selected from the group consisting of the oxide and the dihalides may be condensed with a glyceryl mono-fatty acid ester to produce the reaction products of this invention. In utilizing the organotin dihalide as one of the reactants, it is necessary to conduct the reaction in the presence of a basic acid acceptor or an alkaline neutralizing agent such as sodium carbonate, bicarbonate or hydroxide. These substances accept the acid, e. g. hydrogen chloride, formed during the condensation reaction and are not deleterious to the glyceryl monoester or its derivatives when used in the prescribed manner.

The reactions for the formation of the aforesaid organotin derivatives are illustrated by the following equations:

1. 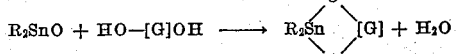

2. 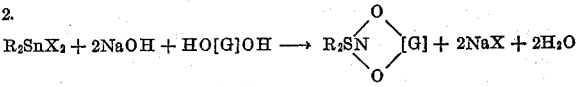

These equations graphically show that the reaction occurs between the hydroxy radicals and the organotin compound whereby water splits off and a chemical bond is formed between the tin and the oxygen. While the equations show the formation of a monomer it will be obvious that polymeric forms can be produced, end groups being provided in various ways as suggested above.

Any suitable reaction temperatures may be employed. It is ordinarily preferred to use elevated temperatures, more particularly above 100° C., because under these conditions the water formed by the reaction passes off as vapor facilitating the completion of the reaction. If preferred, the reaction proper may be carried out at lower temperatures and subsequent heating or other means used to remove the water from the product.

When organotin halides are employed in the reaction there are formed sodium or other halides as shown in Equation 2 above. These are preferably removed by filtration of the water-free reaction product in which they are insoluble. They may also be removed by washing the product with water. A drying step should follow washings.

Another embodiment of the instant invention is the use of inert organic solvents as the medium for the reaction, such as toluene, benzene, etc. The presence of such solvent facilitates the desired reaction. The solvent may be eliminated from the reaction product at the completion of the reaction by any suitable means. This may be accomplished by vaporizing the solvent under vacuum at elevated temperatures, or by other suitable means.

The following examples are further illustrative of these novel organotin derivatives of glyceryl monoesters and their preparation, and it will be understood that the invention is not limited thereto:

EXAMPLE I 0.25 mole dibutyl tin oxide, 0.25 mole glyceryl monooleate (commercial product Glyco Products, S–1096), and 75 ml. toluene are heated and stirred for 4 hours at 118° C. The oxide dissolved after 55 minutes of heating and the water of reaction was removed. Toluene was removed by vacuum distillation. The resultant product was a light colored, viscous liquid weighing 140 gms. and analyzing 20.2% Sn (theoretical 20.3% Sn).

EXAMPLE II 0.25 mole dibutyl tin oxide, 0.25 mole glyceryl monolaurate (commercial product of Glyco Products, S–1062) and 100 ml. toluene are treated in accordance with the process of Example I. The resultant product was a light brown, viscous liquid weighing 124 gms. and containing 23.03% Sn.

EXAMPLE III 0.25 mole dibutyl tin oxide, 0.25 mole glyceryl monostearate (commercial product of Glyco Products, Aldo 28) and 150 ml. toluene are treated according to the process of Example I. The end product was a very viscous liquid weighing 135 gms. and containing 20.2% Sn.

EXAMPLE IV 0.25 mole dibutyl tin oxide, 0.25 mole glyceryl monoricinoleate (commercial product of Glyco Products, –S) and 100 ml. toluene are treated according to the process of Example I. The end product was a very viscous liquid containing 19.6% Sn.

EXAMPLE V 0.25 mole diphenyl tin oxide, 0.25 mole glyceryl monoricinoleate (commercial product of Glyco Products, –S) and 100 ml. toluene are treated according to the process of Example I.

EXAMPLE VI 0.25 mole dimethyl tin oxide, 0.375 mole glyceryl mono-stearate (commercial product of Glyco Products, Aldo 28) and 150 ml. toluene are treated according to the process of Example I. The end product was a very viscous liquid containing 20.2% Sn.

EXAMPLE VII 0.25 mole dibutyl tin dichloride, 0.25 mole glyceryl mono-oleate (commercial product Glyco Products, S–1096), 0.5 mol. NaOH and 75 ml. toluene are heated and stirred for 15 hours at 118° C. The dichloride dissolved after 55 minutes of heating and the water of reaction was removed. The reaction mass was freed of the sodium chloride formed during the reaction by filtration. Toluene was removed by vacuum distillation. The resultant product was a light colored, viscous liquid analyzing 20.2% Sn (theoretical 20.3% Sn).

EXAMPLE VIII

.25 mole of glyceryl monoricinoleate (purified material from Distillation Products Industries), .25 mole of dibutyl tin oxide and 200 ml. of toluene were treated by the procedure of Example I. The product was a somewhat yellow, viscous liquid containing 19.3% tin.

EXAMPLE IX

.25 mol. of monoacetin and .25 mol. of $Bu_2SnO$, 200 ml. of toluene are treated by the procedure of Example I yielding a dibutyl tin derivative of monoacetin.

It has also been discovered and is a feature of this invention that the novel organotin derivatives of glyceryl mono-esters will function as excellent stabilizers for resin compositions, particularly vinyl chloride containing resin compositions containing plasticizers, and when intimately dispersed therein, will provide plastic compositions of improved resistance to heat deterioration. Excellent films are obtained from the aforesaid plastic compositions which exhibit a high degree of stability. The optimum concentration of the aforesaid organotin derivatives, useful as a stabilizer is about 0.25–8% based on the weight of the vinyl resin. The resin composition containing this concentration of stabilizer produces a stable plastic film, which does not darken at elevated temperatures as evidenced by the results of the heat tests in Table I.

The vinyl resins employed were poly-vinyl chloride resins. The stabilizer was incorporated into a mixture of 100 parts by weight of resin and 50 parts by weight of di-2-ethylhexyl phthalate plasticizer.

The mixture was then milled for 5 minutes on a two-roll differential speed mill heated to 320 to 325° F., and removed as a sheet. Portions of the sheet were then placed in a single cavity mold (6" by 6" by 40 mils), preheated to 275° F. The mold was placed on a Preco press and raised to 320° F. under 10,000 pounds total pressure. When the mold reached 320° F. the pressure was increased to 40,000 pounds and held until the temperature reached 330° F. This procedure required five to five and one-half minutes. The mold and press platens were then cooled and the pressed sheet removed.

The pressed sheet was cut into one inch by six-inch strips and placed in clips on a tray so that the strips would hang vertically. The tray was then placed in a circulating air oven held at 320° F. Samples were recovered after one hour, two hours, three hours, and four hours of heat aging. Samples were rated visually, the degree of stability of the vinyl chloride resin film being represented by the depth of colorations.

Table I

| stabilizer | color after heat aging | for number of hours |
| --- | --- | --- |
| None | brown-black | less than 1 hr. |
| product of Ex. 1 | light yellow | 2 hrs. |
| product of Ex. 2 | do | 1 hr. |
| product of Ex. 3 | yellow | 3 hrs. |
| product of Ex. 4 | very light yellow | 4 hrs. |

This table clearly discloses the unusual stabilizing activity of the novel organotin derivatives of glyceryl mono-esters in comparison to a resin without such stabilizer.

The product of Example 8 was tested as a heat stabilizer by a similar procedure except that the aging was carried out at 350° F. instead of 320°. Since at this high temperature the plastics are too soft to be hung on clips, they were carried flat on sheets of glass in the oven. For comparison a similar test was made using 2% dibutyltin dilaurate as stabilizer instead of the product of Example 8. The plastic stabilized with the product of Example 8 became only slightly yellow after 1 hour of aging whereas the plastic stabilized with dibutyltin dilaurate was brown after this time.

Fadeometer light tests were performed on films made by mixing 100 parts of polyvinyl chloride and 40 parts of di-2-ethylhexyl phthalate, and 1 part of the stabilizer of Example IV. This mixture was milled for 5 minutes at 320–325° F. on a 2-roll differential speed mill. The sheet was then pressed at a temperature of 320° F. between two chrome plated sheets of steel on a Preco press at 40,000 lbs. total pressure into a sheet 4–6 mils thick. This sheet was cut to fit Mask No. S1–8A and placed in an Atlas Electric Devices Company Fadeometer.

|  | hours | appearance |
|---|---|---|
| stabilized film | 280 | few small specks. |
| unstabilized film | 72 | seriously discolored and embrittled. |

Other uses of the organotin derivatives are as stabilizers for other chlorinated materials, as rubber accelerators, rubber anti-oxidants, lube oil additives, and polymerization accelerators.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. As a stabilizer for a resin, a novel organotin derivative of a glyceryl mono-ester, selected from the class consisting of alkyltin, aryltin and aralkyltin derivatives of monoesters of saturated, ethylenic unsaturated and hydroxyl substituted aliphatic hydrocarbon monobasic acids wherein alkyl, aryl and aralkyl groups are attached to monoester through tin and tin is connected to the mono-ester through oxygen.

2. An organotin product whose molecules contain as a major part of their structure the grouping

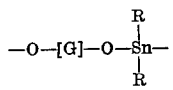

where R is a hydrocarbon radical chosen from the group of alkyl, aryl and aralkyl and [G] is a monoacylated glycerol molecule less two hydroxyl groups, the acyl group of the monoacylated glycerol being the residue of an acid chosen from the class of saturated, ethylenic unsaturated and hydroxyl substituted aliphatic hydrocarbon monobasic acids.

3. A novel monomeric compound having the structural formula:

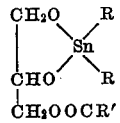

wherein R is selected from the group consisting of alkyl, aryl and aralkyl radicals, and R' is the residue of an organic acid selected from the class consisting of saturated and ethylenic unsaturated and hydroxyl substituted aliphatic hydrocarbon monobasic acids.

4. A novel polymeric compound containing the structural grouping:

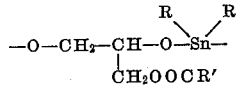

wherein R is selected from the group consisting of alkyl, aryl and aralkyl radicals, and R' is the residue of a hydrocarbon monobasic acid selected from the class consisting of saturated, ethylenic unsaturated, and hydroxyl substituted aliphatic acids.

5. A novel polymeric compound containing the structural grouping:

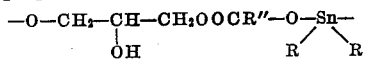

wherein R is selected from the group consisting of alkyl, aryl and aralkyl radicals, and R'' is the residue of a hydroxyl substituted aliphatic hydrocarbon monobasic acid.

6. Dibutyl-tin derivative of glyceryl mono-oleate.
7. Dibutyl-tin derivative of glyceryl mono-stearate.
8. Dibutyl-tin derivative of glyceryl mono-ricinoleate.
9. Dibutyl-tin derivative of glyceryl mono-laurate.
10. Diphenyl tin derivative of glyceryl mono-ricinoleate.

11. A method of preparing organotin derivatives of glyceryl mono-esters which comprises reacting an organotin compound selected from the class consisting of alkyltin, aryltin and aralkyltin oxides and dihalides with a glyceryl mono-ester of the class consisting of saturated, ethylenic unsaturated and hydroxyl substituted aliphatic hydrocarbon monobasic acids removing the water of condensation and recovering said novel organotin derivative of a glyceryl mono-ester.

12. A method of preparing organotin derivatives of glyceryl mono-esters which comprises reacting an organotin oxide selected from the class consisting of alkyltin, aryltin and aralkyltin oxides with a glyceryl mono-ester of the class consisting of saturated, ethylenic unsaturated and hydroxyl substituted aliphatic hydrocarbon monobasic acids, removing the water of condensation and recovering said novel organotin derivative of a glyceryl mono-ester.

13. A method of preparing organotin derivative of glyceryl mono-esters which comprises reacting an organotin dihalide selected from the class consisting of alkyltin, aryltin and aralkyltin dihalides with a glyceryl mono-ester of the class consisting of saturated, ethylenic unsaturated and hydroxyl substituted aliphatic hydrocarbon monobasic acids in the presence of a basic acid acceptor, removing the water of condensation and the inorganic salt formed during the reaction and recovering said novel organotin derivative of a glyceryl mono-ester.

14. A method of preparing organotin derivatives of glyceryl mono-esters which comprises reacting an organotin compound selected from the class consisting of alkyltin, aryltin and aralkyltin oxides and dihalides with a glyceryl mono-ester of the class consisting of saturated, ethylenic unsaturated and hydroxyl substituted aliphatic hydrocarbon monobasic acids in the presence of an inert solvent, removing the water of condensation and recovering said novel organotin derivatives of glyceryl monoesters.

15. A method of preparing organotin derivatives of glyceryl mono-esters containing the structural grouping

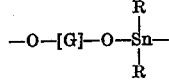

wherein R is selected from the class consisting of alkyl, aryl and aralkyl groups, and [G] is a mono-acylated glycerol molecule less two hydroxyl groups, said acyl group being the residue of an acid selected from the class consisting of saturated, ethylenic unsaturated and hydroxyl substituted aliphatic hydrocarbon monobasic acids, which comprises reacting an organotin compound from the class consisting of alkyltin, aryltin and aralkyltin oxides and dihalides with a glyceryl mono-ester in the presence of an inert solvent, removing the water of condensation and recovering said novel organotin derivative of glyceryl mono-esters.

16. A stable vinyl chloride resin composition containing intimately dispersed therein an organotin derivative of a glyceryl mono-ester selected from the class consisting of alkyltin, aryltin and aralkyltin derivatives of glyceryl monoesters of saturated, ethylenic unsaturated and hydroxyl substituted aliphatic hydrocarbon monobasic acids wherein the alkyl, aryl and aralkyl groups are attached to monoester through tin and tin is connected to the mono-ester through oxygen as a stabilizing agent.

17. A stable vinyl chloride resin composition containing intimately dispersed therein from 0.25 to 8% of an organotin derivative of a glyceryl mono-ester selected from the class consisting of alkyltin, aryltin and aralkyltin derivatives of glyceryl monoesters of saturated, ethylenic unsaturated and hydroxyl substituted aliphatic hydrocarbon monobasic acids wherein the alkyl, aryl and aralkyl groups are attached to monoester through tin and tin is connected to the mono-ester through oxygen as a stabilizing agent.

References Cited in the file of this patent
UNITED STATES PATENTS 2,597,920     Carroll  ---------------- May 27, 1952